US012562494B2

(12) United States Patent
Chu

(10) Patent No.: US 12,562,494 B2
(45) Date of Patent: Feb. 24, 2026

(54) SLOT ANTENNA DEVICE AND SLOT ANTENNA COMBINATION SYSTEM

(71) Applicant: ASUSTeK COMPUTER INC., Taipei (TW)

(72) Inventor: Fang-Hsien Chu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 252 days.

(21) Appl. No.: 17/957,255

(22) Filed: Sep. 30, 2022

(65) Prior Publication Data

US 2023/0246341 A1 Aug. 3, 2023

(30) Foreign Application Priority Data

Jan. 28, 2022 (TW) ................................ 111104099

(51) Int. Cl.
*H01Q 13/10* (2006.01)
*H01Q 13/16* (2006.01)

(52) U.S. Cl.
CPC .......... *H01Q 13/106* (2013.01); *H01Q 13/10* (2013.01); *H01Q 13/16* (2013.01)

(58) Field of Classification Search
CPC ....... H01Q 13/10; H01Q 13/106; H01Q 13/16
See application file for complete search history.

(56) References Cited

U.S. PATENT DOCUMENTS

| | | | | |
|---|---|---|---|---|
| 9,559,422 B2 | 1/2017 | Wong et al. | | |
| 10,644,407 B2 | 5/2020 | Wu et al. | | |
| 2017/0033467 A1* | 2/2017 | Huang | ................... | H01Q 5/357 |
| 2017/0155198 A1* | 6/2017 | Lo | ........................ | H01Q 1/243 |
| 2017/0309993 A1* | 10/2017 | Tu | ........................ | H01Q 13/10 |
| 2019/0221943 A1* | 7/2019 | Wu | ........................ | H01Q 13/16 |
| 2020/0168993 A1 | 5/2020 | Wei | | |
| 2020/0274231 A1* | 8/2020 | Wei | ........................ | H01Q 5/364 |
| 2021/0359410 A1* | 11/2021 | Li | ........................ | H01Q 1/246 |
| 2021/0367321 A1* | 11/2021 | Hung | ..................... | H01Q 5/385 |

FOREIGN PATENT DOCUMENTS

| | | |
|---|---|---|
| CN | 105024134 B | 11/2015 |
| TW | I646730 B | 1/2019 |
| TW | I668914 B | 8/2019 |
| TW | I682582 B | 1/2020 |

* cited by examiner

*Primary Examiner* — Amal Patel

(74) *Attorney, Agent, or Firm* — McClure, Qualey & Rodack, LLP

(57) ABSTRACT

A slot antenna device is disposed on a metal case and includes a slot, a first dielectric substrate, a feeding metal branch, a coupling metal branch, and a signal source. The slot is in the metal case and includes a first long side, a second long side, a first short side and a second short side. The first dielectric substrate is on the metal case adjacent to the first short side of the slot and located above the slot. The feeding metal branch is on the first dielectric substrate and above the slot. A first end of the coupling metal branch is connected to the metal case of the first long side, and a second end of the coupling metal branch extends along the first long side and toward the second short side. The signal source is electrically connected to the feeding metal branch and the metal case.

14 Claims, 9 Drawing Sheets

SLOT ANTENNA DEVICE AND SLOT ANTENNA COMBINATION SYSTEM

CROSS-REFERENCE TO RELATED APPLICATION

This application claims the priority benefit of Taiwan Application Serial No. 111104099, filed on Jan. 28, 2022. The entirety of the above-mentioned patent application is hereby incorporated by reference herein and made a part of the specification.

BACKGROUND OF THE INVENTION

Field of the Invention

The disclosure relates to a slot antenna device and a slot antenna combination system that improve a radiation field pattern.

Description of the Related Art

Conventionally, for the design of an antenna with a metal back cover on a screen of a notebook computer, a slot antenna is often used, so that it is kept that the back cover of the screen is made of metal. The radiation of the slot antenna is implemented with a design in which only a small slot needs to be opened and is combined with an attached printed circuit board (PCB) antenna. However, due to the limitations of physical characteristics of the slot antenna, a radiation field pattern of the slot antenna presents a digital 8-shaped field pattern. That is, the radiation field pattern is strong in a direction of a radiation surface of the slot, and the radiation field pattern is weak in directions of two ends of the slot. Therefore, when a user uses the antenna in a weak signal environment, the reception is often very poor on left and right sides of the antenna.

BRIEF SUMMARY OF THE INVENTION

According to the first aspect of this disclosure a slot antenna device is provided. The slot antenna device is disposed on a metal case, where the slot antenna device includes a slot, a first dielectric substrate, a feeding metal branch, a coupling metal branch, and a signal source. The slot is located in the metal case, and includes a first long side and a second long side that are opposite and a first short side and a second short side that are opposite. The first dielectric substrate is located on the metal case adjacent to the first short side of the slot and located above the slot. The feeding metal branch is located on the first dielectric substrate to be located above the slot. The coupling metal branch includes a first end and a second end, where the first end is connected to the metal case of the first long side, and the second end extends along the first long side and toward the second short side. The signal source is electrically connected to the feeding metal branch and the metal case.

According to the second aspect of this disclosure, a slot antenna combination system is provided. The slot antenna combination system includes a metal case and a slot antenna device, where the slot antenna device is located on the metal case. The slot antenna device includes a slot, a first dielectric substrate, a feeding metal branch, a coupling metal branch, and a signal source. The slot is located in the metal case, and includes a first long side and a second long side that are opposite and a first short side and a second short side that are opposite. The first dielectric substrate is located on the metal case adjacent to the first short side of the slot and located above the slot. The feeding metal branch is located on the first dielectric substrate to be located above the slot. The coupling metal branch includes a first end and a second end, where the first end is connected to the metal case of the first long side, and the second end extends along the first long side and toward the second short side. The signal source is electrically connected to the feeding metal branch and the metal case.

In summary, the disclosure directly mitigates a defect of a field pattern of a slot antenna, and provides a slot antenna device and a slot antenna combination system, to assist with the radiation of a slot by combining different antenna structures, thereby mitigating radiation defects in left and right directions and effectively improving omnidirectional communication quality. Therefore, the disclosure effectively mitigates a field pattern of a radiation defect of a slot and improves the field pattern coverage of an antenna, thereby effectively reducing communication blind spots and improving wireless communication quality.

DETAILED DESCRIPTION OF THE EMBODIMENTS

Figure 1:
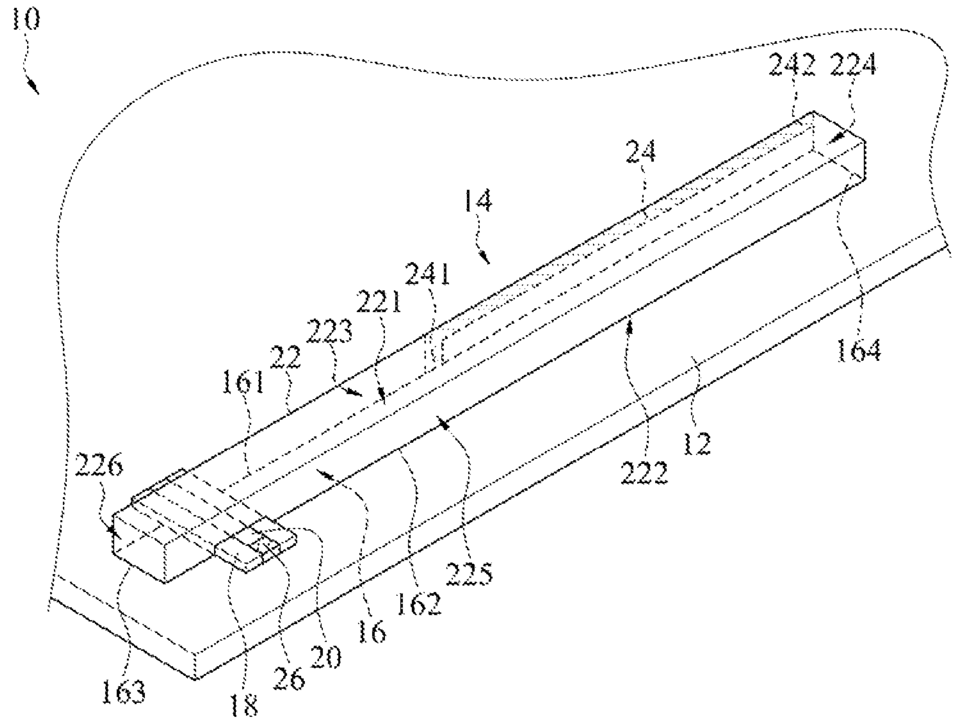
FIG. 1 is a schematic structural diagram of a slot antenna combination system according to an embodiment of the disclosure.

Embodiments of the disclosure are described below in conjunction with relevant drawings. In the drawings, the same label represents the same or similar elements or circuits. It needs to be understood that although the terms "first", "second" and the like are used herein to describe various elements, components, regions or functions, these elements, components, regions and/or functions should not be limited by these terms. These terms are only used to distinguish one element, component, region or function from another element, component, region or function.

Referring to FIG. 1, a slot antenna combination system 10 includes a metal case 12 and a slot antenna device 14. The slot antenna device 14 is located on the metal case 12 to transmit and receive a radio frequency signal. The slot antenna device 14 includes a slot 16, a first dielectric substrate 18, a feeding metal branch 20, a second dielectric substrate 22, a coupling metal branch 24, and a signal source 26.

In an embodiment, the metal case 12 is a screen metal back cover (commonly known as an A component) of an electronic device, a keyboard metal cover (commonly known as a C component) of the electronic device, or a keyboard base (commonly known as a D component) of the electronic device. In the foregoing embodiment, the electronic device is a notebook computer.

As shown in FIG. 1, in the slot antenna device 14, the elongated slot 16 is located in the metal case 12, so that the slot 16 is opened in the metal case 12. The slot 16 includes a first long side 161 and a second long side 162 that are opposite and a first short side 163 and a second short side 164 that are opposite. The first long side 161 is parallel to the second long side 162. The first short side 163 is parallel to the second short side 164. The first dielectric substrate 18 is located on the metal case 12 adjacent to the first short side 163 of the slot 16 and spans the first long side 161 and the second long side 162 of the slot 16, so that two ends of a lower surface of the first dielectric substrate 18 are disposed on the metal case 12. The feeding metal branch 20 is located on the first dielectric substrate 18. The first dielectric substrate 18 is used to support the feeding metal branch 20 to span the slot 16 through the first dielectric substrate 18. The second dielectric substrate 22 is a cuboid. A surface of the second dielectric substrate 22 includes an upper surface 221 and a lower surface 222 corresponding to each other as well as a first side surface 223, a second side surface 224, a third side surface 225, and a fourth side surface 226 around. The second dielectric substrate 22 is located on the slot 16 and the first dielectric substrate 18. In this embodiment, an area of a mounting surface (the lower surface 222) of the second dielectric substrate 22 is exactly equal to a projected area of the slot 16, so that the second dielectric substrate 22 is right above the slot 16 to support the coupling metal branch 24. The coupling metal branch 24 includes a first end 241 and a second end 242. The coupling metal branch 24 is located on the first side surface 223 of the second dielectric substrate 22. The first end 241 is connected to the metal case 12 of the first long side 161. The second end 242 extends upward and bends on the first side surface 223 of the second dielectric substrate 22, then extends in parallel along the first long side 161, and extends toward the second short side 164 to an edge of the first side surface 223 of the second dielectric substrate 22 (that is, an edge of the first side surface 223 adjacent to the second side surface 224). In this embodiment, through characteristics of a strong electric field in the middle of the slot 16 and a strong current in edge metal at both ends of the slot 16 and in combination with a short-circuit position of the coupling metal branch 24 in metal around the slot 16, the coupling metal branch 24 is excited. The coupling metal branch 24 in this embodiment includes one ground point as a parasitic monopole antenna for forming a parasitic structure to add a resonant mode. The signal source 26 is located on the first dielectric substrate 18. One end of the signal source 26 is electrically connected to the feeding metal branch 20, and the other end is connected to the metal case 12 and connected to the ground by the metal case 12, to receive or transmit a radio frequency signal by using the signal source 26.

In an embodiment, the length of the coupling metal branch 24 is adjustable. Connection points at which the first end 241 and the second end 242 are connected to the metal case 12 are also changeable correspondingly according to different antenna pattern designs.

Figure 2:
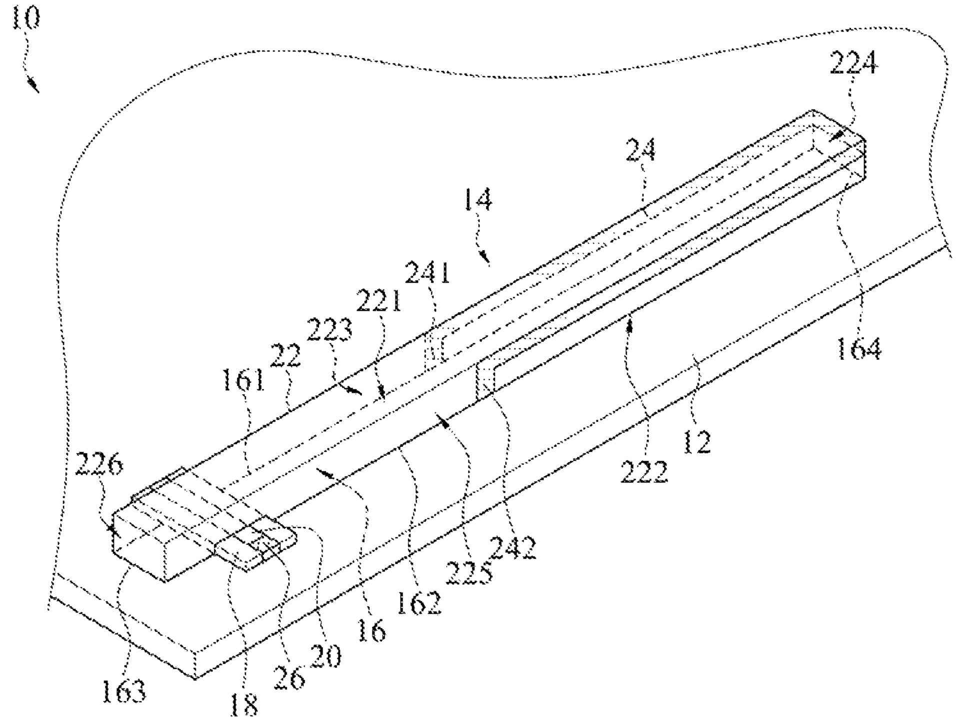
FIG. 2 is a schematic structural diagram of a slot antenna combination system according to another embodiment of the disclosure.

In an embodiment, referring to FIG. 2, in the slot antenna device 14, the coupling metal branch 24 further extends to another side surface in addition to being located on the first side surface 223 of the second dielectric substrate 22. As shown in FIG. 2, the first end 241 of the coupling metal branch 24 is connected to a metal case 12 (approximately at a middle position of the first long side 161 of the slot 16) of the first long side 161. The second end 242 extends upward and bends on the first side surface 223 of the second dielectric substrate 22, then extends along the first long side 161, and extends toward the second short side 164 to the edge of the first side surface 223 of the second dielectric substrate 22 (that is, the edge of the first side surface 223 adjacent to the second side surface 224). The second end 242 then crosses the slot 16 along the second short side 164 on the second side surface 224, extends to the third side surface 225, then extends along the second long side 162 in a direction away from the second short side 164 (that is, toward the first short side 163) on the third side surface 225, and bends toward the second long side 162. In this way, the second end 242 is connected to the metal case 12 of the second long side 162 (roughly located at a middle position of the second long side 162 of the slot 16) and corresponds to the first end 241. In this case, the coupling metal branch 24 is located on the first side surface 223, the second side surface 224, and the third side surface 225 of the second dielectric substrate 22. In this embodiment, through characteristics of a strong electric field in the middle of the slot 16 and a strong current in edge metal at both ends of the slot 16 and in combination with a short-circuit position of the coupling metal branch 24 in metal around the slot 16, the coupling metal branch 24 is excited. The coupling metal branch 24 in this embodiment includes two ground points for use as a parasitic loop structure to add a resonant mode.

Figure 3:
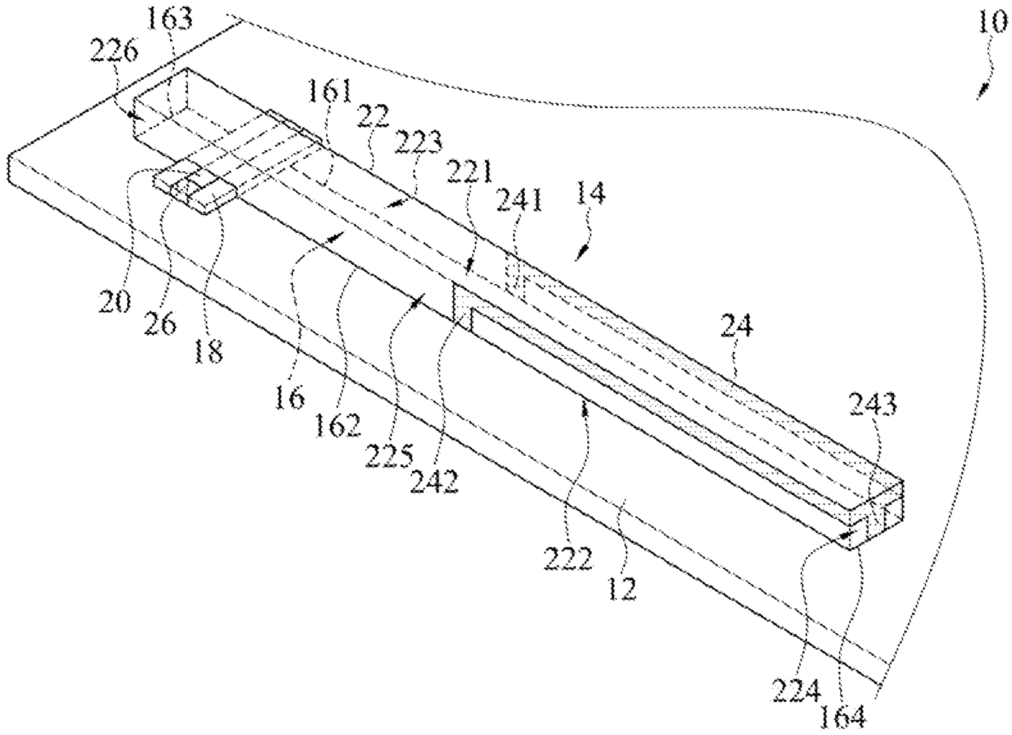
FIG. 3 is a schematic structural diagram of a slot antenna combination system according to still another embodiment of the disclosure.

In an embodiment, referring to FIG. 3, the first end 241 of the coupling metal branch 24 is connected to the metal case 12 of the first long side 161. The second end 242 extends upward and bends on the first side surface 223 of the second dielectric substrate 22, then extends along the first long side 161, and then extends toward the second short side 164 to the edge of the first side surface 223 of the second dielectric substrate 22. The second end 242 then extends along the second short side 164 to the third side surface 225 on the second side surface 224, then extends along the second long side 162 in a direction away from the second short side 164 on the third side surface 225, and bends toward the second long side 162. In this way, the second end 242 is connected to the metal case 12 of the second long side 162 and corresponds to the first end 241. In addition, the coupling metal branch 24 on the second side surface 224 further extends to form a metal portion 243 toward the second short side 164. The metal portion 243 is connected to the metal case 12 of the second short side 164. In this embodiment, through characteristics of a strong electric field in the middle of the slot 16 and a strong current in edge metal at both ends of the slot 16 and in combination with a short-circuit position of the coupling metal branch 24 in metal around the slot 16, the coupling metal branch 24 is excited. The coupling metal branch 24 in this embodiment includes three ground points for use as a parasitic loop structure to add a resonant mode.

Figure 4:
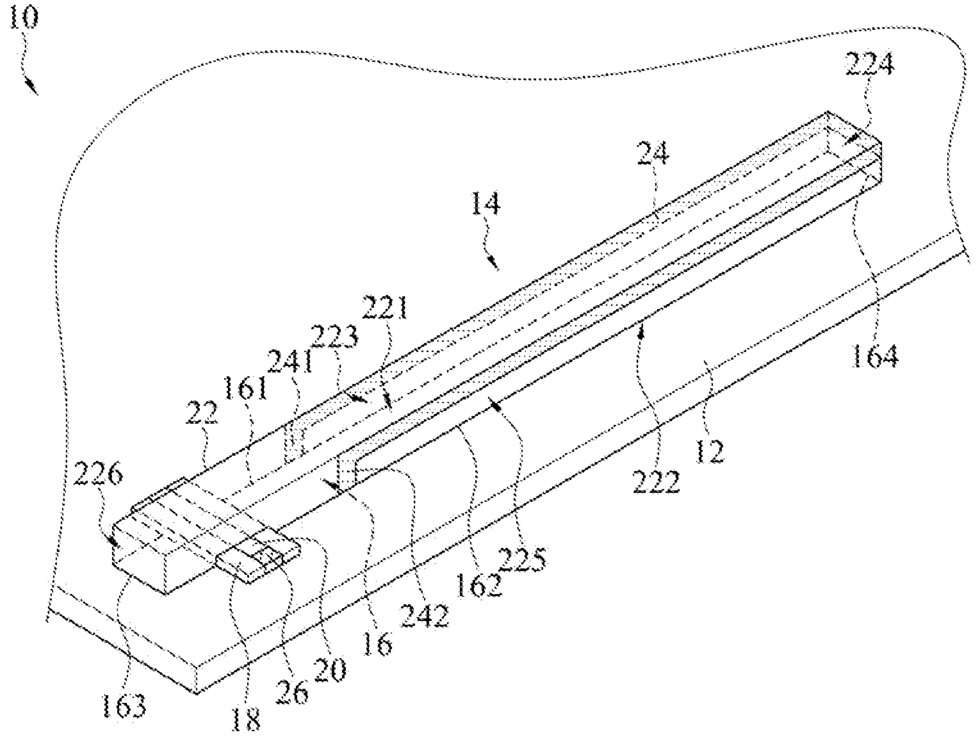
FIG. 4 is a schematic structural diagram of a slot antenna combination system according to yet another embodiment of the disclosure.

In an embodiment, referring to FIG. 4, in the slot antenna device 14, the first end 241 and the second end 242 of the coupling metal branch 24 are closer to the first dielectric substrate 18 and the feeding metal branch 20 on the first dielectric substrate 18. As shown in FIG. 4, the first end 241 of the coupling metal branch 24 is located on the first side surface 223 and close to the feeding metal branch 20. The first end 241 is connected to the metal case 12 of the first long side 161. The second end 242 is located on the third side surface 225 and close to the feeding metal branch 20. The second end 242 is connected to the metal case 12 of the second long side 162. The coupling metal branch 24 is also located on the first side surface 223, the second side surface 224, and the third side surface 225 of the second dielectric substrate 22 for use as a parasitic loop structure to add a resonant mode. Other structures are the same as those in the embodiment shown in FIG. 2. Therefore, reference may be made to the foregoing description, and details are not described herein again.

Figure 5:
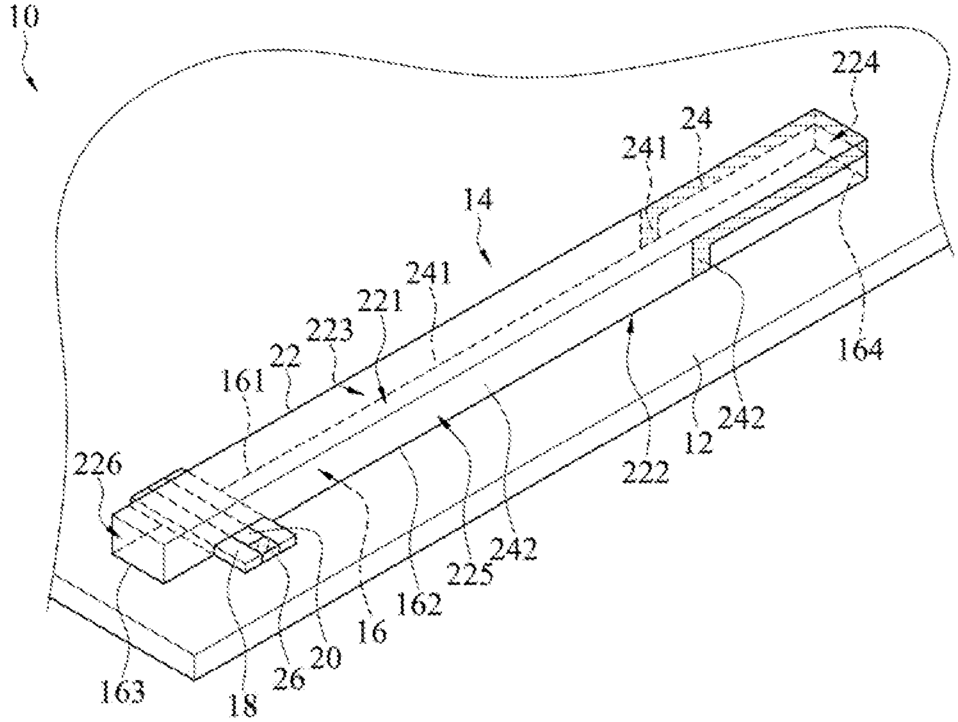
FIG. 5 is a schematic structural diagram of a slot antenna combination system according to yet another embodiment of the disclosure.

In an embodiment, referring to FIG. 5, in the slot antenna device 14, the first end 241 and the second end 242 of the coupling metal branch 24 are farther away from the first dielectric substrate 18 and the feeding metal branch 20 on the first dielectric substrate 18. As shown in FIG. 5, the first end 241 of the coupling metal branch 24 is located on the first side surface 223 and away from the feeding metal branch 20. The first end 241 is connected to the metal case 12 of the first long side 161. The second end 242 is located on the third side surface 225 and away from the feeding metal branch 20. The second end 242 is connected to the metal case 12 of the second long side 162. The coupling metal branch 24 is located on the first side surface 223, the second side surface 224, and the third side surface 225 of the second dielectric substrate 22 for use as a parasitic loop structure to add a resonant mode. Other structures are the same as those in the embodiment shown in FIG. 2. Therefore, reference may be made to the foregoing description, and details are not described herein again.

Figure 6:
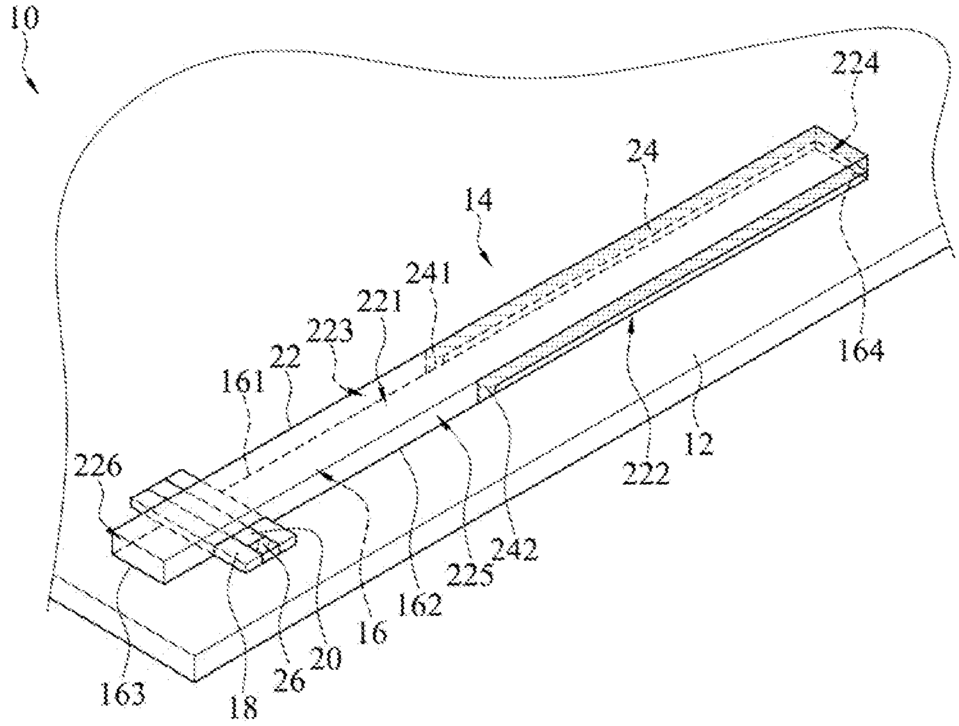
FIG. 6 is a schematic structural diagram of a slot antenna combination system according to yet another embodiment of the disclosure.

In an embodiment, referring to FIG. 6, in the slot antenna device 14, the height of the second dielectric substrate 22 is smaller than that in FIG. 2. The coupling metal branch 24 is simultaneously located on the first side surface 223, the second side surface 224, and the third side surface 225 of the second dielectric substrate 22. Except that the lengths by which the first end 241 and the second end 242 extend upward are shorter, other structures are the same as those in the embodiment shown in FIG. 2. Therefore, reference may be made to the foregoing description, and details are not described herein again.

Figure 7:
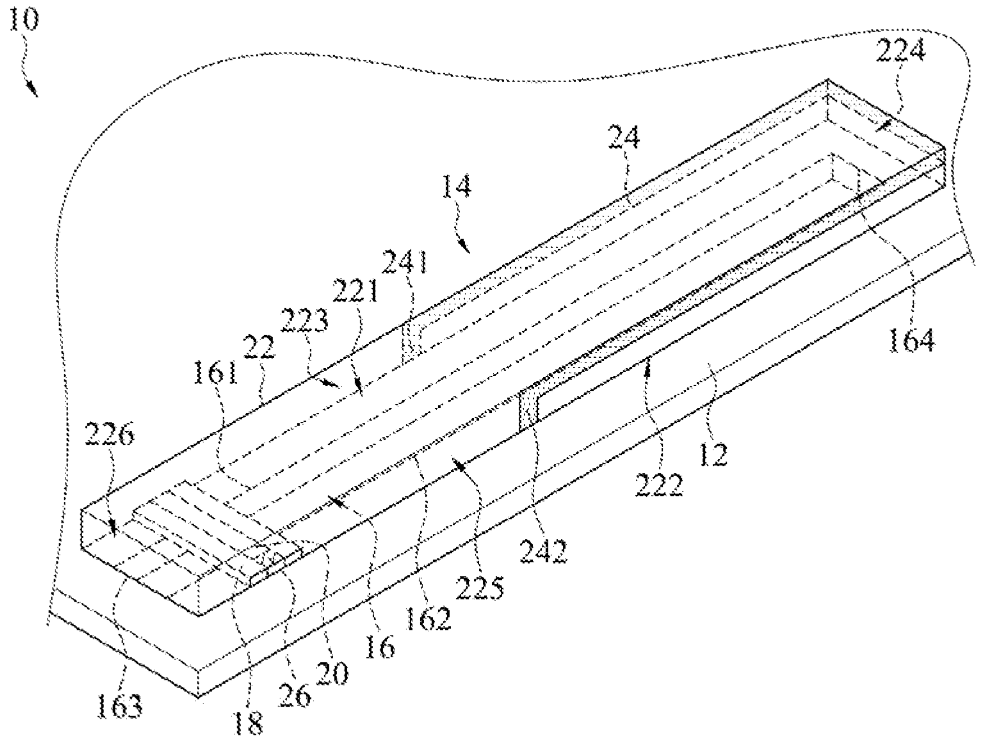
FIG. 7 is a schematic structural diagram of a slot antenna combination system according to yet another embodiment of the disclosure.

In an embodiment, referring to FIG. 7, in the slot antenna device 14, an area of the lower surface (the mounting surface) 222 of the second dielectric substrate 22 is further larger than the projected area of the slot 16. As shown in FIG. 7, since an area of the second dielectric substrate 22 is larger than that of the slot 16, a periphery of the second dielectric substrate 22 is located on the metal case 12 around the slot 16, to make the second dielectric substrate 22 located on the slot 16, the first dielectric substrate 18 (including the feeding metal branch 20), and the metal case 12. The first end 241 of the coupling metal branch 24 located on the first side surface 223 is connected to the metal case 12 adjacent to the first side surface 223. The second end 242 located on the third side surface 225 is connected to the metal case 12 adjacent to the third side surface 225. In this way, the coupling metal branch 24 is still located on the first side surface 223, the second side surface 224, and the third side surface 225 of the second dielectric substrate 22 for use as a parasitic loop structure. Other structures are the same as those in the embodiment shown in FIG. 2. Therefore, reference may be made to the foregoing description, and details are not described herein again. In other embodiments, the second dielectric substrate 22 shown in FIG. 3 to FIG. 6 includes a larger mounting area than that of the slot 16.

In some embodiments, referring to FIG. 1 to FIG. 7, in the slot antenna device 14, the coupling metal branch 24 is designed as a bilaterally symmetric metal structure with the slot 16 as a centerline. That is, the first end 241 and the second end 242 are symmetric to each other.

Figure 8:
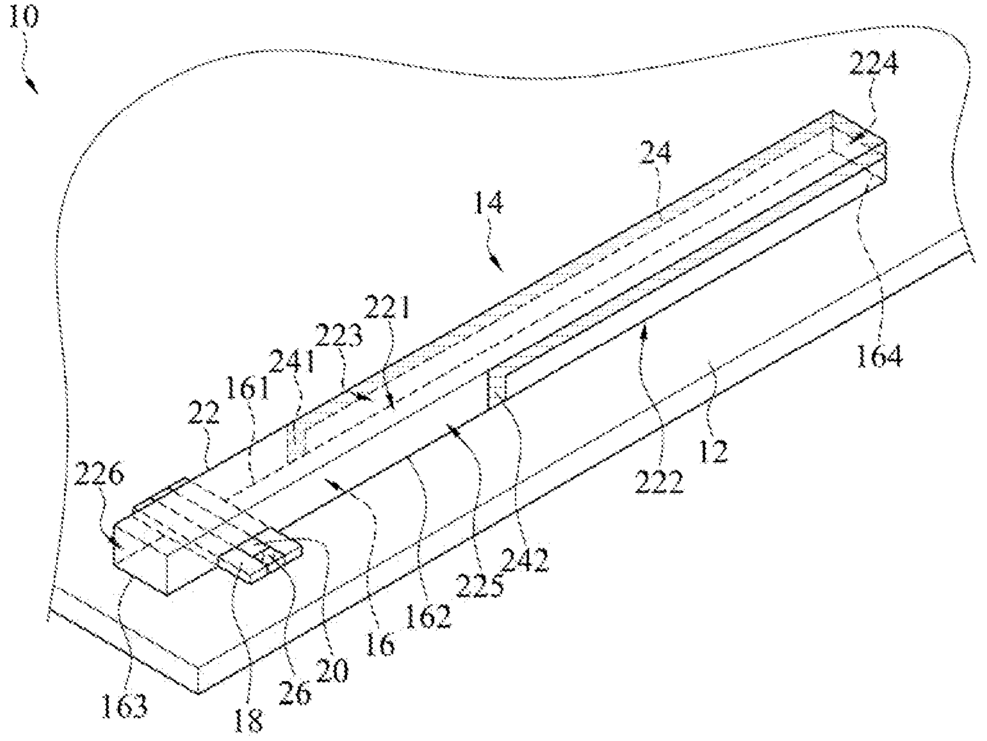
FIG. 8 is a schematic structural diagram of a slot antenna combination system according to yet another embodiment of the disclosure.

In an embodiment, referring to FIG. 8, the first end 241 and the second end 242 of the coupling metal branch 24 are designed as an asymmetric structure. As shown in FIG. 8, the first end 241 of the coupling metal branch 24 is located on the first side surface 223 and close to the feeding metal branch 20. The first end 241 is connected to the metal case 12 of the first long side 161. The second end 242 extends upward and bends on the first side surface 223, then extends along the first long side 161, and extends toward the second short side 164 to the edge of the first side surface 223 of the second dielectric substrate 22. The second end 242 crosses the slot 16 along the second short side 164 on the second side surface 224 and extends to the third side surface 225, then extends along the second long side 162 in a direction away from the second short side 164 (that is, toward the first short side 163) on the third side surface 225, and bends toward the second long side 162 at a middle position of the slot 16. In this way, the second end 242 is connected to the metal case 12 of the second long side 162 (roughly located at the middle position of the second long side 162 of the slot 16). Although the first end 241 and the second end 242 are not in symmetric positions, the coupling metal branch 24 is still located on the first side surface 223, the second side surface 224, and the third side surface 225 of the second dielectric substrate 22. The coupling metal branch 24 in this embodiment includes two ground points for use as a parasitic loop structure to add a resonant mode.

Figure 9:
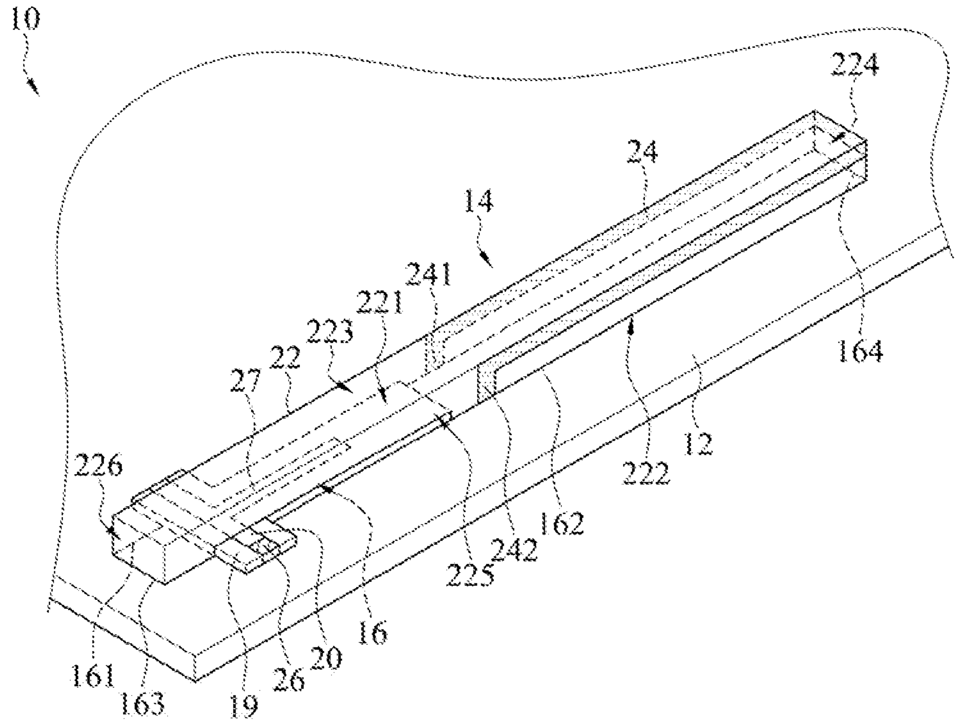
FIG. 9 is a schematic structural diagram of a slot antenna combination system according to yet another embodiment of the disclosure.

In an embodiment, referring to FIG. 9, the slot antenna device 14 further includes a matching metal branch 27, located on a first dielectric substrate 19. One end of the matching metal branch 27 is connected to the feeding metal branch 20, and the other end extends toward the second short side 164, to adjust the impedance matching of the slot antenna device 14 through the length of the matching metal branch 27. Other structures are the same as those in the embodiment shown in FIG. 2. Therefore, reference may be made to the foregoing description, and details are not described herein again.

Figure 10:
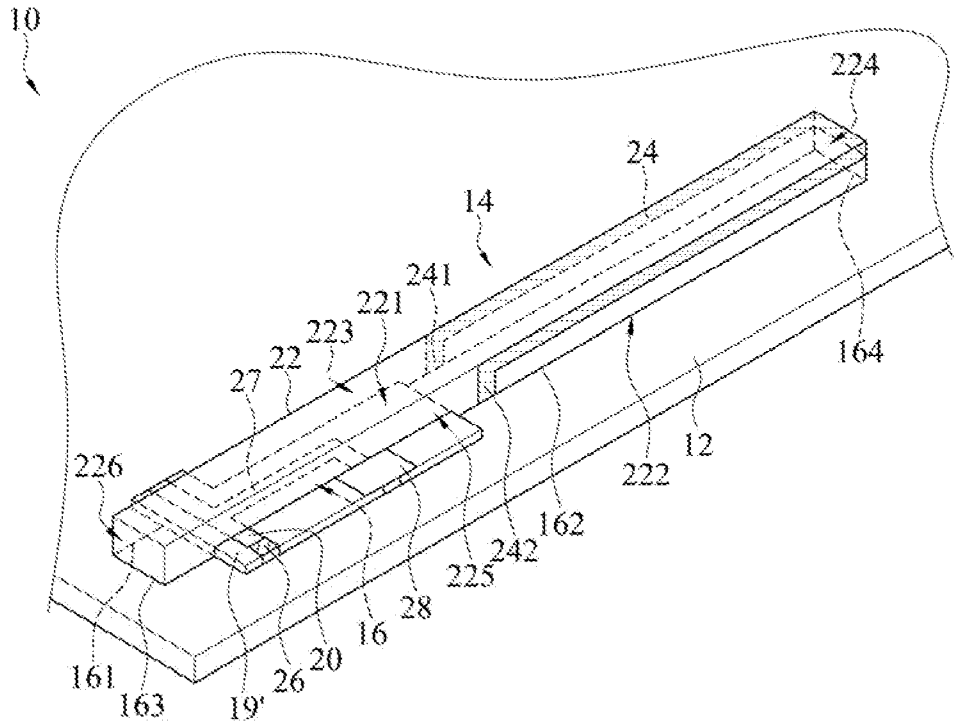
FIG. 10 is a schematic structural diagram of a slot antenna combination system according to yet another embodiment of the disclosure.

In an embodiment, referring to FIG. 10, the slot antenna device 14 further includes a matching metal branch 27 and a matching circuit 28. Both the matching metal branch 27 and the matching circuit 28 are located on a first dielectric substrate 19'. One end of the matching metal branch 27 is connected to the feeding metal branch 20, and the other end extends toward the second short side 164 and is connected to the matching circuit 28. The matching circuit 28 is then connected to the metal case 12 for grounding. In this embodiment, apart from adjusting the impedance matching of the slot antenna device 14 through the length of the matching metal branch 27, the disclosure adjusts the impedance matching of the slot antenna device 14 through the design of the matching circuit 28, thereby effectively improving the impedance matching of the slot antenna device 14. Other structures are the same as those in the embodiment shown in FIG. 2. Therefore, reference may be made to the foregoing description, and details are not described herein again.

Figure 11:
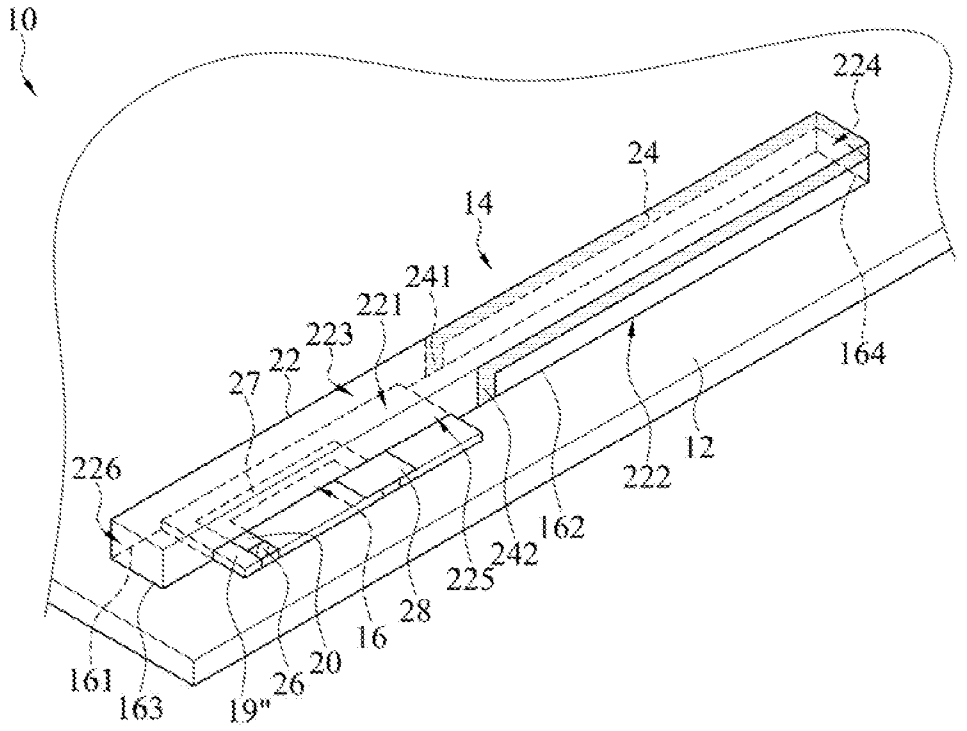
FIG. 11 is a schematic structural diagram of a slot antenna combination system according to yet another embodiment of the disclosure.

In an embodiment, referring to FIG. 11, the slot antenna device 14 includes a slot 16, a first dielectric substrate 19", a feeding metal branch 20, a second dielectric substrate 22, a coupling metal branch 24, a signal source 26, a matching metal branch 27, and a matching circuit 28. In the slot antenna device 14, the first dielectric substrate 19" is located on the metal case 12 adjacent to the first short side 163 of the slot 16 and is disposed on the metal case 12 next to the second long side 162 of the slot 16, so that the first dielectric substrate 19" is located above the slot 16. The feeding metal branch 20, the matching metal branch 27, and the matching circuit 28 are located on the first dielectric substrate 19". The first dielectric substrate 19" is used to support the feeding metal branch 20, the matching metal branch 27 and the matching circuit 28. In this way, the feeding metal branch 20 and the matching metal branch 27 are located above the slot 16 through the first dielectric substrate 19". One end of the feeding metal branch 20 is electrically connected to the signal source 26, and the other end is connected to the matching metal branch 27. One end of the matching metal branch 27 is connected to the feeding metal branch 20, and the other end extends toward the second short side 164 and bends to connect to the matching circuit 28. The matching circuit 28 is then connected to the metal case 12 for grounding. In this embodiment, the disclosure adjusts the impedance matching of the slot antenna device 14 through the length of the matching metal branch 27 as well as the matching circuit 28, thereby effectively improving the impedance matching of the slot antenna device 14. The disclosure also adjusts a resonant mode through the matching circuit 28. Other structures are the same as those in the embodiment shown in FIG. 2. Therefore, reference may be made to the foregoing description, and details are not described herein again.

In an embodiment, as shown in FIG. 10 and FIG. 11, the matching circuit 28 is an L-type matching circuit or a π-type matching circuit, which is formed by capacitors or inductors with different values.

Figure 12:
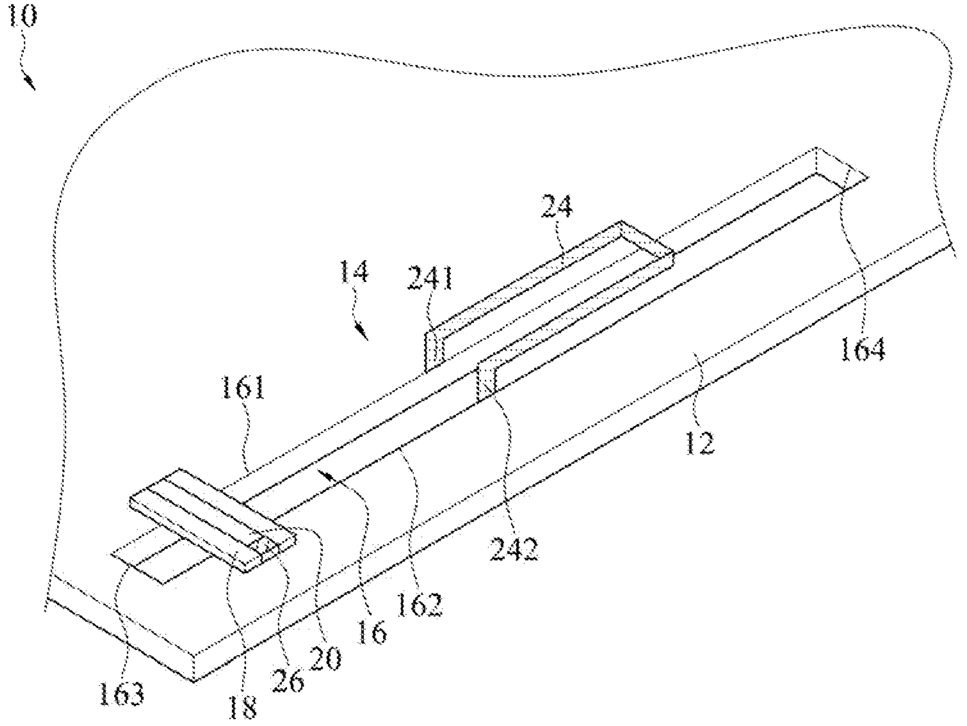
FIG. 12 is a schematic structural diagram of a slot antenna combination system according to yet another embodiment of the disclosure.

In an embodiment, referring to FIG. 12, a slot antenna combination system 10 includes a metal case 12 and a slot antenna device 14. The slot antenna device 14 is disposed on the metal case 12. The slot antenna device 14 includes a slot 16, a first dielectric substrate 18, a feeding metal branch 20, a coupling metal branch 24, and a signal source 26.

As shown in FIG. 12, in the slot antenna device 14, the elongated slot 16 is located in the metal case 12, so that the slot 16 is opened in the metal case 12. The slot 16 includes a first long side 161 and a second long side 162 that are opposite and a first short side 163 and a second short side 164 that are opposite. The first dielectric substrate 18 is located on the metal case 12 adjacent to the first short side 163 of the slot 16 and spans the first long side 161 and the second long side 162 of the slot 16, so that two ends of a lower surface of the first dielectric substrate 18 are disposed on the metal case 12. The feeding metal branch 20 is located on the first dielectric substrate 18. The first dielectric substrate 18 is used to support the feeding metal branch 20 to span the slot 16 through the first dielectric substrate 18. The coupling metal branch 24 includes a first end 241 and a second end 242. The coupling metal branch 24 is connected across the metal case 12 on two sides of the slot 16. The first end 241 is connected to the metal case 12 on the first long side 161. The second end 242 extends upward and bends, then extends in parallel along the first long side 161, and extends toward the second short side 164 by a distance. The second end 242 bends to cross the slot 16, then extends along the second long side 162 and away from the second short side 164 (that is, toward the first short side 163), and then bends toward the second long side 162. In this case, the second end 242 is connected to the metal case 12 of the second long side 162 and corresponds to the first end 241. The coupling metal branch 24 in this embodiment includes two ground points for use as a parasitic loop structure to add a resonant mode. The signal source 26 is located on the first dielectric substrate 18. One end of the signal source 26 is electrically connected to the feeding metal branch 20, and the other end is connected to the metal case 12 and connected to the ground by the metal case 12, to receive or transmit a radio frequency signal by using the signal source 26.

In other embodiments, as shown in FIG. 1 to FIG. 11, in these slot antenna devices 14, the arrangement of the second dielectric substrate 22 is omitted. The coupling metal branch 24 is directly disposed on the metal case 12 on one side or both sides of the slot 16 without the second dielectric substrate 22.

In an embodiment, as shown in FIG. 1 to FIG. 12, the feeding metal branch 20 is formed on the first dielectric substrate 18 by printing. As shown in FIG. 1 to FIG. 11, the coupling metal branch 24 is formed on the second dielectric substrate 22 by printing. In an embodiment, the first dielectric substrate 18 and the feeding metal branch 20 on the first dielectric substrate 18 are a PCB printed with an antenna pattern. The second dielectric substrate 22 and the coupling metal branch 24 on the second dielectric substrate 22 are a PCB printed with an antenna pattern.

In an embodiment, as shown in FIG. 1 to FIG. 12, the feeding metal branch 20, the coupling metal branch 24 (including the metal portion 243), and the like are made of conductive materials such as silver, copper, iron, aluminum or an alloy thereof. However, the disclosure is not limited thereto.

Figure 13:
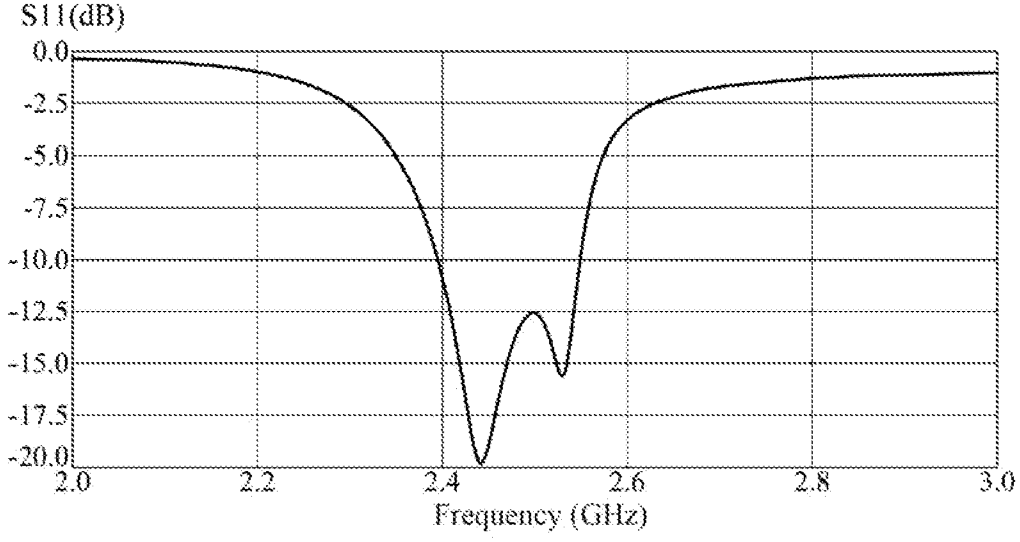
FIG. 13 is a schematic simulated diagram of an S-parameter generated by a slot antenna device at a specific frequency according to the disclosure.

Referring to FIG. 1 to FIG. 12, the disclosure uses the first dielectric substrate 18 and the feeding metal branch 20 on the first dielectric substrate 18 to cross the slot 16 or be located above the slot 16, to excite the slot antenna device 14 to form a first resonant mode. Through the design of the coupling metal branch 24, the parasitic loop structure or the parasitic monopole antenna structure is formed to add a second resonant mode. As shown in FIG. 13, the slot antenna device 14 in FIG. 2 is used for simulation of an S-parameter (S11). When an operation is performed in a 2.4 GHz frequency band, a simulation result of the S-parameter is shown in FIG. 13. As can be seen, the slot antenna device 14 forms the first resonant mode and the second resonant mode.

Figure 14:
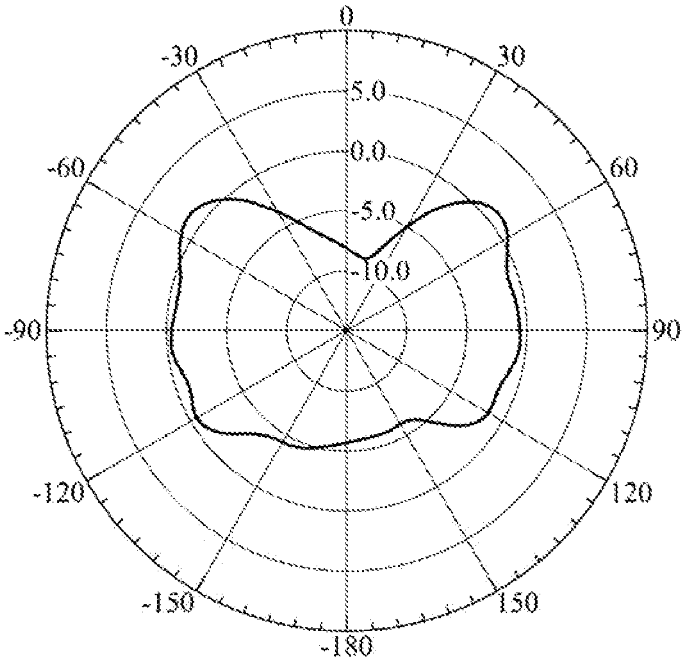
FIG. 14 is a schematic diagram of a radiation field pattern simulated by a slot antenna device according to the disclosure.

It is designed that the first resonant mode is adjacent to the second resonant mode, so that a field pattern of the second resonant mode effectively assists in mitigating defects of a field pattern of the slot antenna device 14 in two end directions of the slot 16 of the first resonant mode. As shown in FIG. 14, the deepest point of a field pattern is increased from —14.5 dBi to —8.8 dBi to greatly mitigate a defect of the field pattern of the slot antenna device 14, thereby effectively reducing communication blind spots and improving communication quality.

Figure 15:
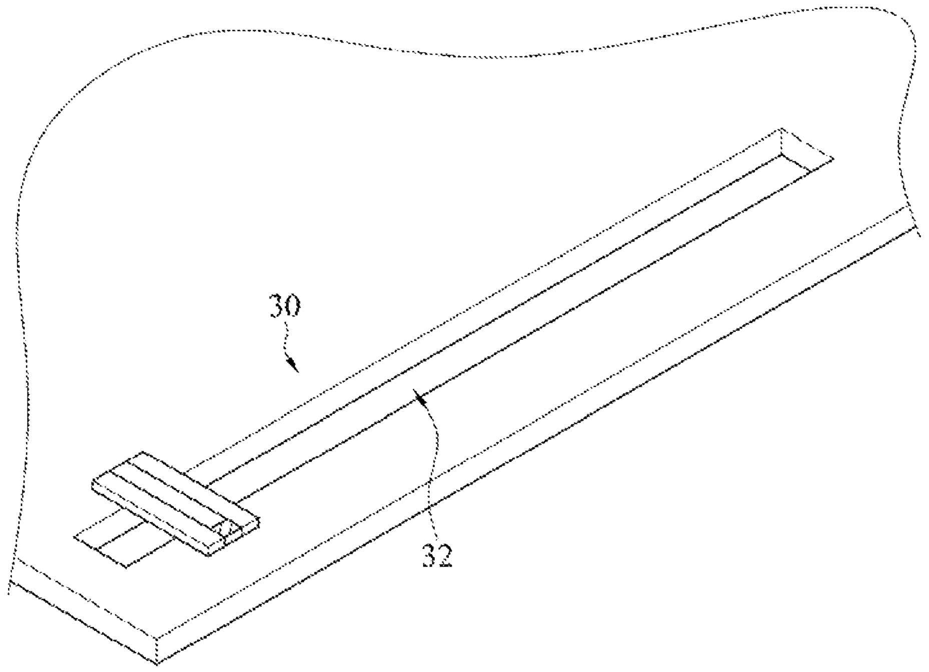
FIG. 15 is a schematic structural diagram of a conventional slot antenna.
Figure 16:
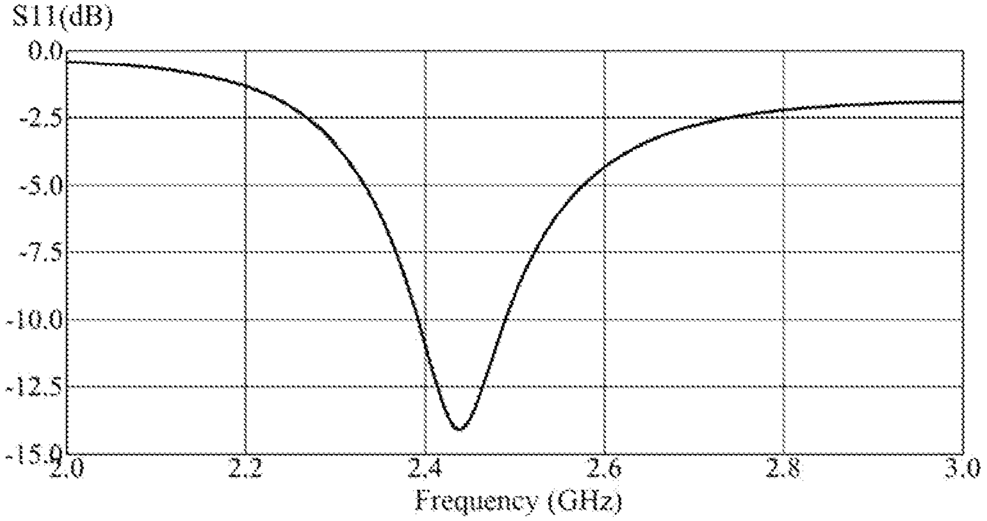
FIG. 16 is a schematic simulated diagram of an S-parameter generated by a conventional slot antenna at a specific frequency.
Figure 17:
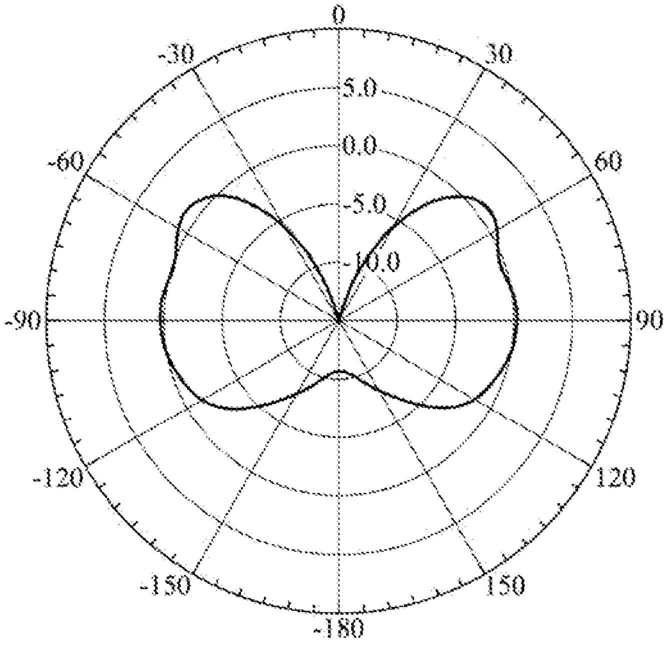
FIG. 17 is a schematic diagram of a radiation field pattern simulated by a conventional slot antenna.

Compared with the design of a conventional slot antenna 30 without a coupling metal branch, for example, the slot antenna 30 in FIG. 15, the S-parameter (S11) is simulated and analyzed with the slot antenna 30. When an operation is performed in a 2.4 GHz frequency band, the simulation result of the S-parameter is shown in FIG. 16. The slot antenna 30 only forms one resonant mode. Referring to a diagram of a field pattern shown in FIG. 17, it is found that a field pattern of the slot antenna 30 is defects of a field pattern in two end directions of the slot 32. Therefore, in a weak signal environment, communication blind spots tend to appear on left and right sides. In contrast, the disclosure effectively improves a radiation field pattern and provides better communication quality.

The disclosure provides a slot antenna device and a slot antenna combination system with an improved field pattern. The disclosure adds a coupling metal branch to a design of a feeding coupling metal branch and a slot. A parasitic loop structure is formed through the design of the coupling metal branch. A second resonant mode is added near a first resonant mode of the original slot, to effectively generate a new field pattern to help mitigate a defect of the field pattern in two end directions of the slot and improve the coverage of an antenna pattern. Moreover, the disclosure uses a combination of the first resonant mode and the second resonant mode to increase a synthetic bandwidth, which improves an error tolerance rate of frequency offset during assembly, thereby improving the assembly yield and quality.

In summary, the disclosure directly mitigates a defect of a field pattern of a slot antenna, and provides a slot antenna device and a slot antenna combination system, to assist with the radiation of a slot by combining different antenna structures (a feeding metal branch and a coupling metal branch), thereby mitigating radiation defects in left and right directions and effectively improving omnidirectional communication quality. Therefore, the disclosure effectively mitigates a field pattern of a radiation defect of a slot and improves the field pattern coverage of an antenna, thereby effectively reducing communication blind spots and improving wireless communication quality.

The above-mentioned embodiments are only to illustrate technical ideas and characteristics of the disclosure. An objective is to enable those familiar with the technology to understand the content of the disclosure and implement based on this. The embodiments cannot be used to limit the patent scope of the disclosure. That is, all equal changes or modifications made in accordance with the spirit of the disclosure should still fall within the scope of the claims of the disclosure.

What is claimed is:

1. A slot antenna device, disposed on a metal case, wherein the slot antenna device comprises:

a slot, located in the metal case, wherein the slot comprises a first long side and a second long side that are opposite and a first short side and a second short side that are opposite;

a first dielectric substrate, located on the metal case and adjacent to the first short side of the slot and located above the slot;

a feeding metal branch, located on the first dielectric substrate to be located above the slot;

a coupling metal branch separated from the first dielectric substrate, comprising a first end and a second end, wherein the first end is connected to the metal case and located on the first long side, and a portion of the coupling metal branch extends along the first long side and toward the second short side, wherein the portion of the coupling metal branch further crosses the slot from the first long side to the second long side and then extends along the second long side in a direction away from the second short side and terminates at the second end, and the second end is connected to the metal case and located on the second long side; and a signal source, electrically connected to the feeding metal branch and the metal case.

2. The slot antenna device according to claim1, wherein the coupling metal branch is designed as a bilaterally symmetric metal structure with the slot as a centerline.

3. The slot antenna device according to claim 1, wherein the portion of the coupling metal branch further extends along the second short side to cross the slot from the first long side-and then extends along the second long side in the direction away from the second short side.

4. The slot antenna device according to claim 3, wherein the portion of the coupling metal branch arranged along the second short side further forms a metal portion to connect to the metal case at an edge of the second short side.

5. The slot antenna device according to claim 1, further comprising a matching metal branch, located on the first dielectric substrate, wherein one end of the matching metal branch is connected to the feeding metal branch, and the other end extends toward the second short side.

6. The slot antenna device according to claim 5, further comprising a matching circuit, located on the first dielectric substrate, wherein the matching circuit is connected to the feeding metal branch and the metal case.

7. The slot antenna device according to claim 1, further comprising a second dielectric substrate, wherein the second dielectric substrate is located on the slot and the first dielectric substrate, to make the coupling metal branch located on a surface of the second dielectric substrate.

8. A slot antenna combination system, comprising:

a metal case; and a slot antenna device, located on the metal case, wherein the slot antenna device comprises:

a slot, located in the metal case, wherein the slot comprises a first long side and a second long side that are opposite and a first short side and a second short side that are opposite;

a first dielectric substrate, located on the metal case and adjacent to the first short side of the slot and located above the slot;

a feeding metal branch, located on the first dielectric substrate to be located above the slot;

a coupling metal branch separated from the first dielectric substrate, comprising a first end and a second end, wherein the first end is connected to the metal case and located on the first long side, and a portion of the coupling metal branch extends along the first long side and toward the second short side;

a signal source, electrically connected to the feeding metal branch and the metal case;

a matching metal branch, located on the first dielectric substrate, wherein one end of the matching metal branch is connected to the feeding metal branch, and the other end extends toward the second short side; and a matching circuit, located on the first dielectric substrate, wherein the matching circuit is connected to the matching metal branch and the metal case.

9. The slot antenna combination system according to claim 8, wherein the portion of the coupling metal branch further crosses the slot from the first long side to the second long side and then extends along the second long side in a direction away from the second short side and terminates at the second end, and the second end is connected to the metal case and located on the second long side.

10. The slot antenna combination system according to claim 9, wherein the coupling metal branch is designed as a bilaterally symmetric metal structure with the slot as a centerline.

11. The slot antenna combination system according to claim 9, wherein the portion of the coupling metal branch further extends along the second short side to cross the slot from the first long side and then extends along the second long side in the direction away from the second short side.

12. The slot antenna combination system according to claim 11, wherein the portion of the coupling metal branch arranged along the second short side further forms a metal portion to connect to the metal case at an edge of the second short side.

13. The slot antenna combination system according to claim 8, further comprising a second dielectric substrate, wherein the second dielectric substrate is located on the slot and the first dielectric substrate, to make the coupling metal branch located on a surface of the second dielectric substrate.

14. A slot antenna device, disposed on a metal case, wherein the slot antenna device comprises: a slot, located in the metal case, wherein the slot comprises a first long side and a second long side that are opposite and a first short side and a second short side that are opposite; a first dielectric substrate, located on the metal case and adjacent to the first short side of the slot and located above the slot; a feeding metal branch, located on the first dielectric substrate to be located above the slot; a coupling metal branch separated from the first dielectric substrate is located on an outer side of the first dielectric substrate not above the first dielectric substrate, comprising a first end and a second end, wherein the first end is connected to the metal case and located on the first long side, and a portion of the coupling metal branch extends along the first long side and toward the second short side; and a signal source, electrically connected to the feeding metal branch and the metal case.

* * * * *